(12) United States Patent
Markert

(10) Patent No.: US 12,515,315 B2
(45) Date of Patent: Jan. 6, 2026

(54) ACTUATOR, ACTUATOR DEVICE, ROBOT, AND SERIES OF ACTUATOR DEVICES

(71) Applicant: SUMITOMO HEAVY INDUSTRIES, LTD., Tokyo (JP)

(72) Inventor: Sebastian Markert, Markt Indersdorf (DE)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 16 days.

(21) Appl. No.: 18/060,953

(22) Filed: Dec. 1, 2022

(65) Prior Publication Data

US 2023/0173665 A1  Jun. 8, 2023

(30) Foreign Application Priority Data

Dec. 3, 2021 (JP) .................. 2021-196765

(51) Int. Cl.
  *B25J 9/12* (2006.01)
(52) U.S. Cl.
  CPC ..................... *B25J 9/126* (2013.01)
(58) Field of Classification Search
  CPC ........................................... B25J 9/126
  See application file for complete search history.

(56) References Cited

U.S. PATENT DOCUMENTS

| | | | | |
|---|---|---|---|---|
| 5,912,541 A | * | 6/1999 | Bigler | .......... H02K 11/215 |
| | | | | 318/625 |
| 6,084,373 A | * | 7/2000 | Goldenberg | ......... B25J 9/08 |
| | | | | 901/23 |
| 2012/0286604 A1 | * | 11/2012 | Abe | .......... H02K 11/33 |
| | | | | 310/71 |
| 2017/0040737 A1 | * | 2/2017 | Kim | .......... H05K 5/0065 |
| 2019/0232999 A1 | | 8/2019 | Yamashita | |
| 2021/0154864 A1 | * | 5/2021 | Muneto | ........ B25J 17/0258 |

FOREIGN PATENT DOCUMENTS

| | | | |
|---|---|---|---|
| CN | 113263518 A | * | 8/2021 |
| EP | 1 814 433 B1 | | 3/2017 |
| JP | H7-112379 A | | 5/1995 |
| JP | H10-248199 A | | 9/1998 |
| JP | 2000-217310 A | | 8/2000 |
| JP | 2005-151771 A | | 6/2005 |
| JP | 2006-187149 A | | 7/2006 |
| JP | 2007-37238 A | | 2/2007 |
| JP | 2018-42448 A | | 3/2018 |
| JP | 2019 097265 A | | 6/2019 |
| JP | 2021-97430 | | 6/2021 |
| WO | WO2018/062004 A | | 4/2018 |

OTHER PUBLICATIONS

Machine translation of CN-113263518-A (Year: 2021).*
European search report of EP 22 20 4032 Dated on May 10, 2023.
Office Action of JP Application No. 2021-196765 Mailed on Apr. 15, 2025.

* cited by examiner

*Primary Examiner* — Randell J Krug
(74) *Attorney, Agent, or Firm* — WTA IP Law P.C.

(57) ABSTRACT

An actuator controlled by a driver, includes an actuator-side connector that is detachably connected to a driver-side connector provided in the driver, in which the actuator is able to be electrically connected to the driver, by connecting the actuator-side connector and the driver-side connector to each other.

20 Claims, 10 Drawing Sheets

ACTUATOR, ACTUATOR DEVICE, ROBOT, AND SERIES OF ACTUATOR DEVICES

CROSS-REFERENCE TO RELATED APPLICATIONS

This application claims priority to Japanese Patent Application No. 2021-196765, filed on Dec. 3, 2021, which is incorporated by reference herein in its entirety.

BACKGROUND

Technical Field

Certain embodiments of the present disclosure relate to an actuator.

Description of Related Art

The related art discloses an actuator device including an actuator, and a driver that controls the actuator.

SUMMARY

According to an embodiment of the present invention, there is provided an actuator controlled by a driver, and including an actuator-side connector that is detachably connected to a driver-side connector provided in the driver, in which the actuator is able to be electrically connected to the driver, by connecting the actuator-side connector and the driver-side connector to each other.

DETAILED DESCRIPTION

Figure 1:
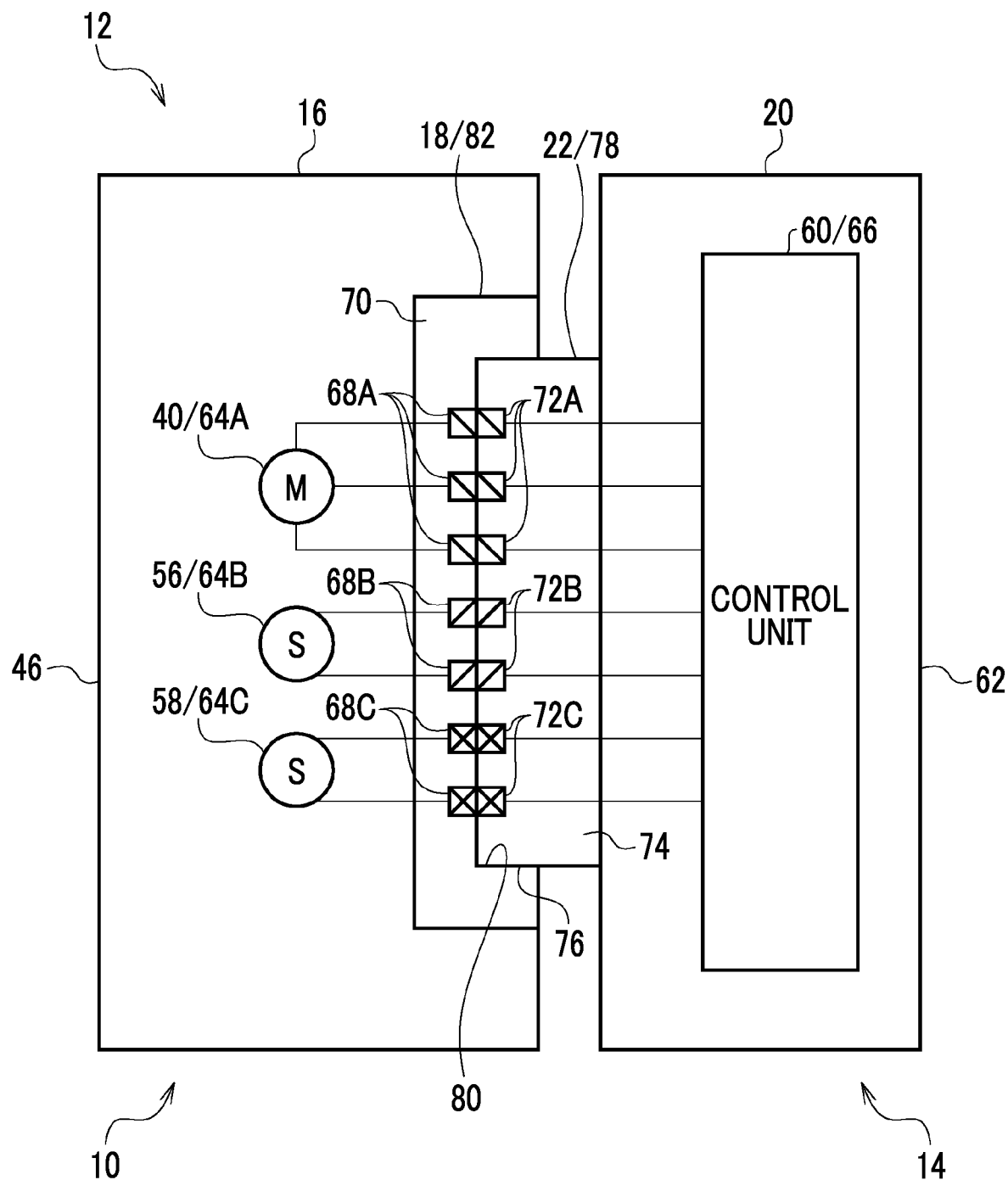
FIG. 1 is a schematic view showing a use state of an actuator of a first embodiment in a first use mode.

The actuator of the related art is inseparably integrated with the driver, and the degree of freedom of change in the use mode is low in relation to the driver. The inventors of the present application have recognized that there is room for improvement in terms of usability of such an actuator.

It is desirable to provide an actuator that is easy to use.

Hereinafter, embodiments will be described. The same reference numerals are added to the same components, and duplicated description will be omitted. In each drawing, components are omitted, enlarged, or reduced as appropriate for convenience of explanation. The drawings shall be viewed according to the orientation of the reference numerals.

First Embodiment

Figure 2:
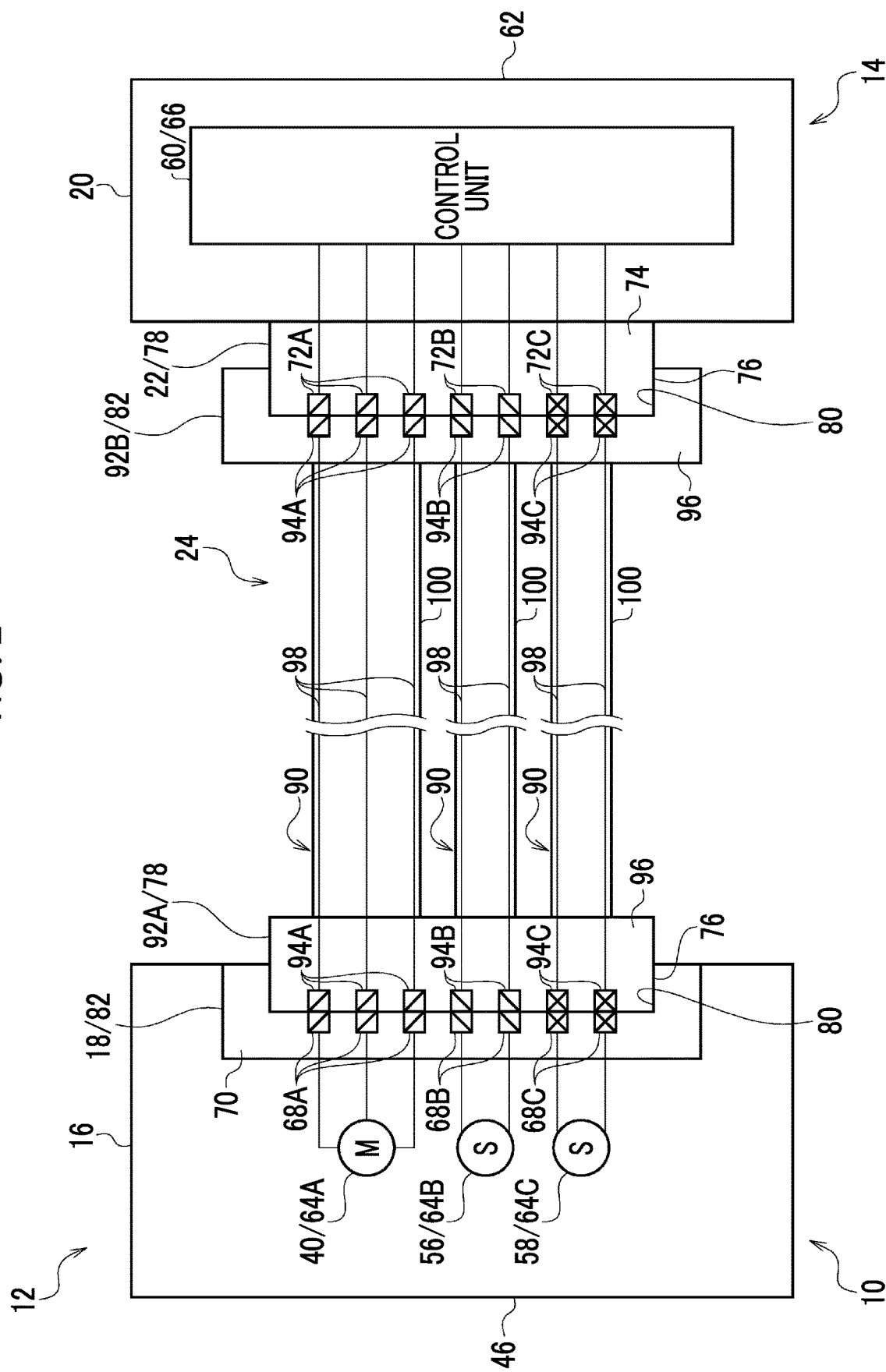
FIG. 2 is a schematic view showing a use state of the actuator of the first embodiment in a second use mode.
Figure 3:
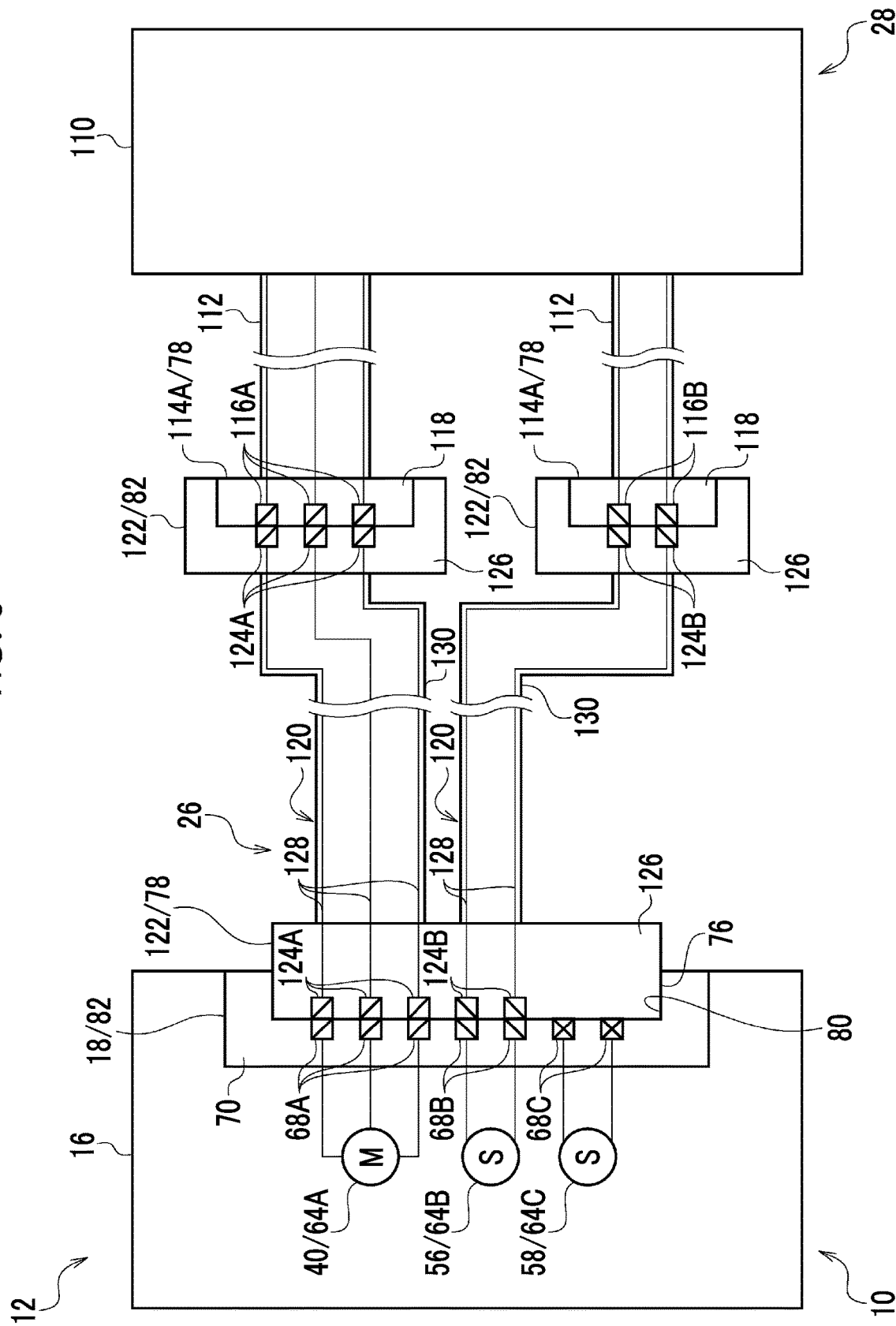
FIG. 3 is a schematic view showing a use state of the actuator of the first embodiment in a third use mode.

An actuator 10 of a first embodiment will be described. FIGS. 1 to 3 are referred to. An actuator device 12 in which the actuator 10 of the present embodiment is used includes a driver 14 that controls the actuator 10, in addition to the actuator 10. The actuator 10 includes an actuator main body 16, and an actuator-side connector 18 attached to the actuator main body 16. The driver 14 includes a driver main body 20, and a driver-side connector 22 attached to the driver main body 20.

The actuator 10 of the present embodiment can be used in a first use mode as shown in FIG. 1, in which the connectors 18 and 22 are connected and electrically connected to the driver 14. In addition to this, the actuator 10 can also be used in other use modes in which the connectors 18 and 22 are disconnected. The other use modes here are, for example, a second use mode and a third use mode to be described below. In the second use mode, as shown in FIG. 2, the actuator 10 is used by being electrically connected to the driver 14 by using a first wiring member 24. In the third use mode, as shown in FIG. 3, the actuator 10 is used by being electrically connected to an external device 28 different from the driver 14 by using a second wiring member 26.

In the first use mode and the second use mode, the actuator 10 and the driver 14 provided by the provider (for example, the manufacturer or the seller) of the actuator device 12 are used by the user as the actuator 10 and the driver 14 are. On the other hand, in the third use mode, the actuator 10, among the actuator 10 and the driver 14 provided by the provider of the actuator device 12, and the external device 28 prepared by the user are used in combination. The user can use the actuator 10 in any use mode selected from the first use mode and other use modes (second use mode, third use mode, or the like). Hereinafter, the actuator 10 and the driver 14 used in the first use mode will be described, and then the second use mode and the third use mode will be described in order.

First Use Mode

Figure 4:
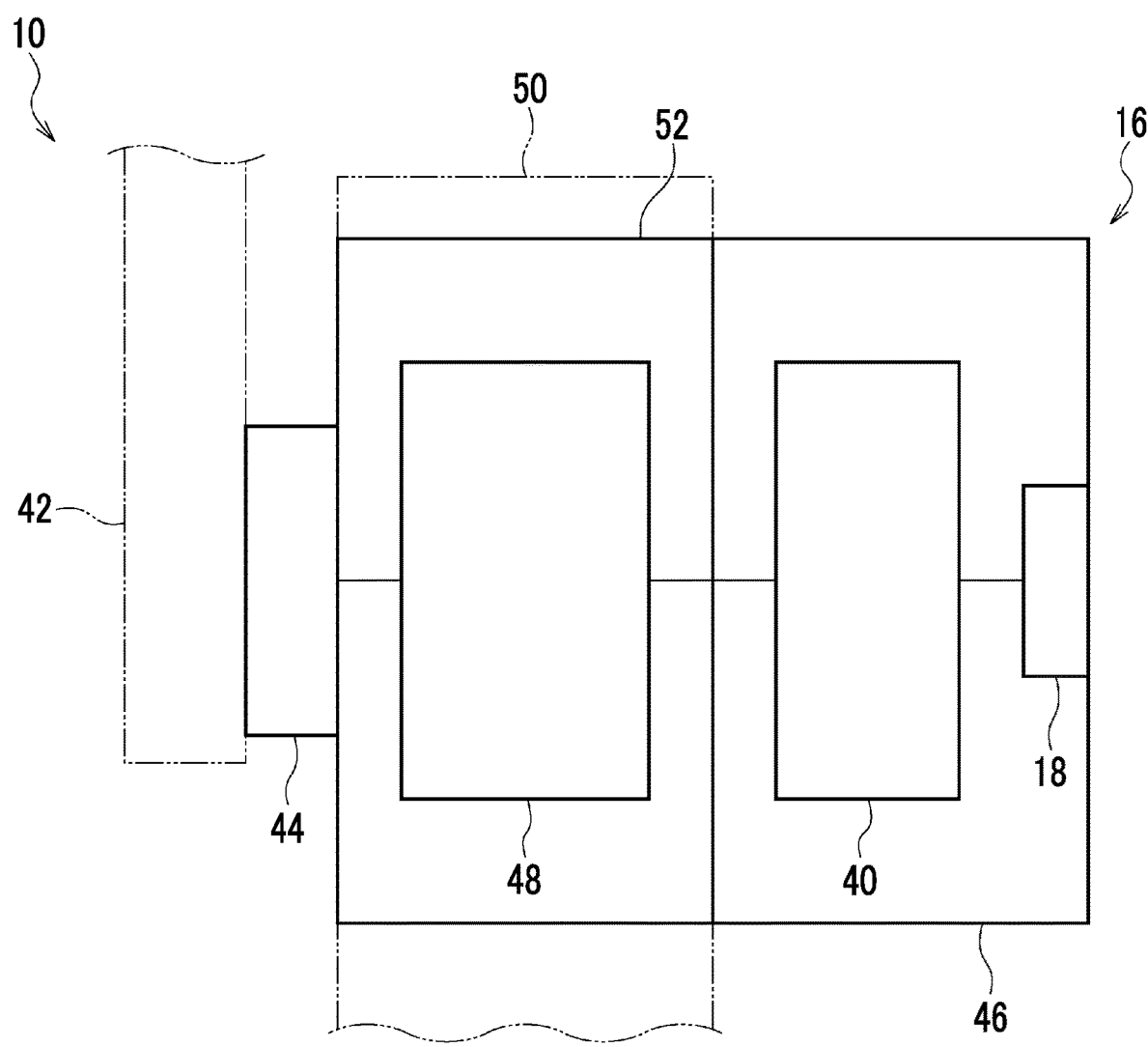
FIG. 4 is a schematic view showing the actuator of the first embodiment.

FIG. 4 is referred to. The outline of the actuator 10 will be described. The actuator main body 16 of the actuator 10 includes a drive source 40, an output member 44 that outputs power transmitted from the drive source 40 to a driven member 42 outside the actuator 10, and an actuator casing 46 that houses the drive source 40. In addition, the actuator main body 16 includes a power transmission mechanism 48 that transmits the power output from the drive source 40 to the output member 44, and a support member 52 that is supported by a supported member 50 outside the actuator 10.

The actuator 10 of the present embodiment is an electric actuator with the drive source 40 as an electric motor (rotary motor). Specific examples of the drive source 40 are not particularly limited, and a solenoid, a linear motor, an engine, or the like may be used. The electric motor of the present embodiment is a three-phase AC motor, and includes a stator and a rotor (not shown). The output member 44 of the present embodiment outputs a rotating motion as a power to the driven member 42, but the type of the motion is not particularly limited, and a linear motion or the like may be output.

The power transmission mechanism 48 of the present embodiment is a reduction mechanism, and the rotational power output from the drive source 40 is decelerated and then transmitted to the output member 44. Specific examples of the transmission element used in the reduction mechanism are not particularly limited, and for example, gears, chains, belts, or the like may be used. When a gear mechanism is used as the reduction mechanism, specific examples thereof are not particularly limited, and a planetary gear mechanism, an orthogonal shaft gear mechanism, a parallel shaft gear mechanism, an eccentric oscillating gear mechanism, a flexure meshing gear mechanism, or the like may be used.

The support member 52 of the present embodiment is a casing (reduction gear casing) different from the actuator casing 46 that houses the power transmission mechanism 48, and the output member 44 is a carrier used for the gear mechanism. In addition to this, the casing may be the output member 44, and the carrier may be the support member 52.

FIG. 1 is referred to again. In addition, the actuator main body 16 includes a first sensor 56 and a second sensor 58 for detecting a predetermined physical quantity. In the present embodiment, the first sensor 56 is a rotation sensor (encoder) that detects the rotation angle of the output member 44, and the second sensor 58 is a torque sensor that detects the torque of the output member 44.

The driver main body 20 includes a control unit 60 that controls the actuator 10, and a driver casing 62 that houses the control unit 60. The control unit 60 is, for example, a microcomputer configured by a control board with a driver IC or the like. The control unit 60 of the present embodiment can control the actuator 10 by generating drive power by using electric power supplied from an external power source and supplying the drive power to the drive source 40 to drive the drive source 40. The control unit 60 of the present embodiment generates three-phase AC power as drive power, and supplies the three-phase AC power to the drive source 40 which is a three-phase AC motor.

The control unit 60 of the present embodiment controls the actuator 10 based on the detection results of the sensors 56 and 58. The control unit 60 performs feedback-control for controlling the actuator 10 such that the detection value output as the detection result from the first sensor 56 (encoder) approaches the control target value, for example. The detection value and the target value here are the rotation angle of the output member 44 in the present embodiment. At this time, the control unit 60 reads out the control parameter (proportional gain, integral gain, or the like) stored in the storage unit, and controls the actuator 10 by using the read control parameter. In addition to this, the control unit 60 may detect contact with an obstacle based on the detection value of the second sensor 58 (torque sensor), and control the actuator 10 based on the detection result.

The control unit 60 of the present embodiment is electrically connected to an external host controller (not shown). The host controller is, for example, a master controller that collectively controls a plurality of drivers 14 that function as slave controllers. The control unit 60 of the present embodiment controls the actuator 10 by controlling the drive source 40 according to a control command (including a control target value) output from the host controller.

The actuator 10 includes actuator-side electric devices 64A to 64C, and the driver 14 includes a driver-side electric device 66. Both the actuator-side electric devices 64A to 64C and the driver-side electric device 66 operate using electricity. The actuator-side electric devices 64A to 64C and the driver-side electric device 66 are objects to be electrically connected to each other. The actuator 10 of the present embodiment includes a drive source 40 (electric motor) as the first actuator-side electric device 64A, a first sensor 56 as the second actuator-side electric device 64B, and a second sensor 58 as the third actuator-side electric device 64C. The driver 14 of the present embodiment includes a control unit 60 (microcomputer) as a driver-side electric device 66.

The actuator-side connector 18 is attached to the actuator main body 16 without the intervention of a wiring member having flexibility that allows relative movement with respect to the actuator main body 16. In order to implement this, the actuator-side connector 18 of the present embodiment is directly or indirectly attached to the actuator casing 46 of the actuator main body 16 (see also FIG. 2). The "indirect" as used herein means, for example, a case where the actuator-side connector 18 is attached to the actuator casing 46 via another member (for example, a circuit board, or the like). The actuator-side connector 18 is attached to the actuator casing 46 by fitting, screwing, gluing, welding, or the like.

The actuator-side connector 18 includes a plurality of types of actuator-side terminals 68A to 68C, and an actuator-side connector housing 70 that holds the plurality of types of actuator-side terminals 68A to 68C. The actuator-side connector housing 70 integrally holds a plurality of types of actuator-side terminals 68A to 68C.

The driver-side connector 22 is attached to the driver main body 20 without the intervention of a wiring member having flexibility that allows relative movement with respect to the driver main body 20. In order to implement this, the driver-side connector 22 of the present embodiment is directly or indirectly attached to the driver casing 62 of the driver main body 20. The driver-side connector 22 is attached to the driver casing 62 by fitting, screwing, gluing, welding, or the like.

The driver-side connector 22 includes a plurality of types of driver-side terminals 72A to 72C, and a driver-side connector housing 74 that holds the plurality of types of driver-side terminals 72A to 72C. The driver-side connector housing 74 integrally holds a plurality of types of driver-side terminals 72A to 72C.

The number of types of terminals 68A to 68C and 72A to 72C of the connectors 18 and 22 is the same as the number of actuator-side electric devices 64A to 64C to be electrically connected to the driver-side electric device 66. In the present embodiment, since there are three actuator-side electric devices 64A to 64C satisfying this condition, the number of types of terminals 68A to 68C and 72A to 72C of the connectors 18 and 22 is three. The plurality of types of terminals 68A to 68C and 72A to 72C respectively correspond to the plurality of actuator-side electric devices 64A to 64C, and are used for electrical connection to the corresponding actuator-side electric devices 64A to 64C. The plurality of types of terminals 68A to 68C and 72A to 72C of the present embodiment include a plurality of first terminals 68A and 72A corresponding to the first actuator-side electric device 64A (drive source 40), a plurality of second terminals 68B and 72B corresponding to the second actuator-side electric device 64B (first sensor 56), and a plurality of third terminals 68C and 72C corresponding to the third actuator-side electric device 64C (second sensor 58).

In the present embodiment, the first terminals 68A and 72A are power supply terminals used for transmitting electric power used for the drive source 40. For the connectors 18 and 22, the number of first terminals 68A and 72A according to the electric power used by the drive source 40 are used. Since the drive source 40 of the present embodiment uses three-phase AC power, a total of three first terminals 68A and 72A is used for the connectors 18 and 22 for supplying electric power for each phase (U phase, V phase, W phase). In the present embodiment, the second terminals 68B and 72B and the third terminals 68C and 72C are signal terminals used for transmitting signals used in the sensors 56 and 58 corresponding to the second terminals 68B and 72B and the third terminals 68C and 72C.

As described above, the terminals 68A to 68C and 72A to 72C are used for transmitting at least one of the electric power and the signals used in the actuator-side electric devices 64A to 64C corresponding to the terminals 68A to 68C and 72A to 72C. When terminals 68A to 68C and 72A to 72C are used for transmitting signals, each of the terminals 68A to 68C and 72A to 72C may be used as either an input terminal for inputting a signal to the actuator-side electric devices 64A to 64C or an output terminal for outputting a signal. Further, some of the plurality of terminals 68A to 68C and 72A to 72C belonging to the same type may be used for electric power transmission, and the remaining terminals 68A to 68C and 72A to 72C may be used for signal transmission.

The driver-side connector 22 is detachably connected to the actuator-side connector 18. The driver-side connector 22 and the actuator-side connector 18 are directly connected without the intervention of a wiring member having flexibility that allows the actuator 10 and the driver 14 to move relative to each other.

One of the actuator-side connector 18 and the driver-side connector 22 is a male connector 78 having a projected shape 76, and the other is a female connector 82 having a recessed shape 80 that fits with the projected shape 76. In the present embodiment, the actuator-side connector 18 is a female connector 82, and the driver-side connector 22 is a male connector 78.

The actuator-side connector 18 and the driver-side connector 22 are connected by relatively moving in a connection direction approaching each other (the direction in which the connectors 18 and 22 approach each other in the horizontal direction of the paper surface in FIG. 1). At this time, the projected shape 76 of the male connector 78 is inserted into the recessed shape 80 of the female connector 82. Further, the actuator-side connector 18 and the driver-side connector 22 are disconnected by being relatively moved in the connection release direction (the direction in which the connectors 18 and 22 are away from each other in the horizontal direction of the paper surface in FIG. 1), which is the direction opposite to the connection direction. At this time, the projected shape 76 of the male connector 78 is extracted from the recessed shape 80 of the female connector 82. The projected shape 76 and the recessed shape 80 of the present embodiment are provided in the connector housings 70 and 74 of the actuator-side connector 18 and the driver-side connector 22, respectively. In addition to this, the projected shape 76 and the recessed shape 80 may be provided at the terminals 68A to 68C and 72A to 72C of the actuator-side connector 18 and the driver-side connector 22, respectively.

In the first use mode, the driver-side connector 22 and the actuator-side connector 18 are connected. In this state, the respective terminals 68A to 68C and 72A to 72C of the driver-side connector 22 and the actuator-side connector 18 are made conductive. At this time, the terminals 68A to 68C and 72A to 72C for electrically connecting to the actuator-side electric devices 64A to 64C common in the driver-side connector 22 and the actuator-side connector 18 come into contact with each other and are made conductive. The combination of terminals 68A to 68C and 72A to 72C which are made conductive with each other in the connectors 18 and 22 is not particularly limited, but may be, for example, a combination of a pin terminal and a socket terminal.

In the first use mode, the actuator 10 and the driver 14 are electrically connected by connecting the actuator-side connector 18 and the driver-side connector 22. Specifically, at this time, the actuator-side electric devices 64A to 64C and the driver-side electric device 66 are electrically connected. In the present embodiment, the first actuator-side electric device 64A (drive source 40) and the driver-side electric device 66 (control unit 60) are electrically connected via the first terminals 68A and 72A of the connectors 18 and 22. Further, the second actuator-side electric device 64B (first sensor 56) and the driver-side electric device 66 (control unit 60) are electrically connected via the second terminals 68B and 72B of the connectors 18 and 22, respectively. Further, the third actuator-side electric device 64C (second sensor 58) and the driver-side electric device 66 (control unit 60) are electrically connected via the third terminals 68C and 72C of the connectors 18 and 22, respectively.

The actuator-side connector 18 and the driver-side connector 22 may be provided with a detachment prevention structure that prevents the connectors 18 and 22 from being detached by limiting the relative movement in the connection release direction. The detachment prevention structure here may be composed of, for example, an elastic portion that applies an elastic repulsive force that limits the relative movement in the detachment direction, by elastic deformation when the connectors 18 and 22 are connected. As a result, it is possible to effectively prevent the connectors 18 and 22 from being detached even when vibration or the like is applied to the actuator 10 and the driver 14.

Second Use Mode

FIG. 2 is referred to. The first wiring member 24 used in the second use mode will be described. The first wiring member 24 includes a first electric wire 90 having flexibility, and a pair of first wiring-side connectors 92A and 92B provided at both ends of the first electric wire 90.

The pair of first wiring-side connectors 92A and 92B are individually provided corresponding to the actuator-side connector 18 and the driver-side connector 22, and are individually and detachably connected to the corresponding connectors 18 and 22. The first wiring-side connectors 92A and 92B include a plurality of types of first wiring-side terminals 94A to 94C, and a first wiring-side connector housing 96 that holds the plurality of types of first wiring-side terminals 94A to 94C. The first wiring-side connector housing 96 integrally holds a plurality of types of first wiring-side terminals 94A to 94C.

The number of the first electric wires 90 used for the first wiring member 24 and the number of types of the first wiring-side terminals 94A to 94C are the same as the number of actuator-side electric devices 64A to 64C to be electrically connected to the driver-side electric device 66. In the present embodiment, since there are three actuator-side electric devices 64A to 64C satisfying this condition, the number of the first electric wires 90 is three, and the number of types of the first wiring-side terminals 94A to 94C is three. The plurality of first electric wires 90 and the plurality of types of first wiring-side terminals 94A to 94C respectively correspond to the plurality of actuator-side electric devices 64A to 64C, and are used for electrical connection to the corresponding actuator-side electric devices 64A to 64C. Similar to the actuator-side terminals 68A to 68C and the driver-side terminals 72A to 72C, the plurality of types of terminals 94A to 94C used in the first wiring member 24 include the plurality of first terminal 94A corresponding to the first actuator-side electric device 64A, a plurality of second terminals 94B corresponding to the second actuator-side electric device 64B, and a plurality of third terminals 94C corresponding to the third actuator-side electric device 64C.

The first electric wire 90 includes a plurality of conductive first conducting wires 98, and a first covering material 100 having insulation properties that covers the plurality of first conducting wires 98. The plurality of first conducting wires 98 are used for electrical connection to the actuator-side electric devices 64A to 64C corresponding to the first electric wires 90.

Among the pair of first wiring-side connectors 92A, one first wiring-side connector 92A is detachably connected to the actuator-side connector 18, and the other first wiring-side connector 92B is detachably connected to the driver-side connector 22. At this time, in the first wiring-side connector 92A and the actuator-side connector 18 which are connected to each other, the terminals 68A to 68C and 94A to 94C for electrically connecting to the common actuator-side electric devices 64A to 64C come into contact with each other and are made conductive. Further, in the first wiring-side connector 92B and the driver-side connector 22 which are connected to each other, the terminals 72A to 72C and 94A to 94C for electrically connecting to the common actuator-side electric devices 64A to 64C come into contact with each other and are made conductive. Thus, the actuator-side electric devices 64A to 64C and the driver-side electric device 66 are electrically connected as in the first use mode.

Here, at least one of a first combination of the one first wiring-side connector 92A and the driver-side connector 22 and a second combination of the other first wiring-side connector 92B and the actuator-side connector 18 is configured with the same parts. In the present embodiment, both the first combination and the second combination are configured with the individual same parts. The "same parts" here mean separate things, but things that are the same not only in the shape and dimensions of the parts configuring the two connectors mentioned above but also in the materials (same design) thereof. The two connectors mentioned use the same connector housing, which means that the two connectors use the same number of types and the same number of terminals. Regarding the one first wiring-side connector 92A and the driver-side connector 22, both use the same connector housings 74 and 96, and use the same number of types and the same number of terminals 72A to 72C and 94A to 94C. Further, the one first wiring-side connector 92A is the same male connector 78 as the driver-side connector 22, and the other first wiring-side connector 92B is the same female connector 82 as the actuator-side connector 18.

Third Use Mode

FIG. 3 is referred to. The third use mode will be described. The external device 28 of the present embodiment is an external driver that controls the actuator 10. The external device 28 corresponds to at least one of the plurality of actuator-side electric devices 64A to 64C, and can be electrically connected to the corresponding actuator-side electric devices 64A to 64C by using the second wiring member 26. The external device 28 of the present embodiment corresponds to the first actuator-side electric device 64A (drive source 40) and the second actuator-side electric device 64B (first sensor 56), which are a part of the three actuator-side electric devices 64A to 64C, and does not correspond to the third actuator-side electric device 64C (second sensor 58). In addition to this, the external device 28 may correspond to all of the plurality of actuator-side electric devices 64A to 64C.

The external device 28 includes an external device main body 110, and external connectors 114A and 114B attached to the external device main body 110 via a cable 112. The external device main body 110 of the present embodiment includes a microcomputer (not shown) having the same function as the control unit 60 described above, and can control the actuator 10. However, the external device main body 110 of the present embodiment is different from the above-described control unit 60 in that the external device main body 110 can perform feedback-control using the detection value of the first sensor 56 (encoder) but cannot perform control using the detection value of the second sensor 58 (torque sensor).

The external connectors 114A and 114B include a plurality of types of external terminals 116A and 116B, and an external connector housing 118 that holds the plurality of types of external terminals 116A and 116B. The external connectors 114A and 114B cannot be connected to the actuator-side connector 18. The external connectors 114A and 114B are provided corresponding to the actuator-side electric devices 64A and 64B to be electrically connected to the external device 28, and are used for electrical connection between the corresponding actuator-side electric devices 64A and 64B and the external device 28.

The external connectors 114A and 114B of the present embodiment are provided one-to-one with the plurality of actuator-side electric devices 64A and 64B to be electrically connected to the external device 28, respectively. That is, the external connectors 114A and 114B of the present embodiment include an external connector 114A having a one-to-one correspondence with the first actuator-side electric device 64A, and an external connector 114B having a one-to-one correspondence with the second actuator-side electric device 64B. In addition to this, the external connector may be provided in a one-to-one correspondence with a combination of the plurality of actuator-side electric devices 64A and 64B to be electrically connected to the external device 28. For example, there may be only one external connector having a one-to-one correspondence with the combination of the first actuator-side electric device 64A and the second actuator-side electric device 64B. In addition to this, the external connector may be provided in a one-to-one correspondence with a single actuator-side electric device, and may be provided in a one-to-one correspondence with a combination of a plurality of actuator-side electric devices.

The second wiring member 26 functions as an adapter that electrically connects the external connectors 114A and 114B and the actuator-side connector 18 that cannot be connected to each other. The second wiring member 26 includes a second electric wire 120 having flexibility, and second wiring-side connectors 122 provided at both ends of the second electric wire 120.

The second wiring-side connector 122 is individually provided corresponding to each of the actuator-side connector 18 and the external connectors 114A and 114B, and is detachably connected to the corresponding connectors 18, 114A and 114B. The second wiring-side connector 122 includes a plurality of types of second wiring-side terminals 124A and 124B, and a second wiring-side connector housing 126 that holds the plurality of types of second wiring-side terminals 124A and 124B.

The number of the second electric wires 120 and the number of types of the second wiring-side terminals 124A and 124B used for the second wiring member 26 are the same as the number of the actuator-side electric devices 64A and 64B to be electrically connected to the external device 28. In the present embodiment, since there are two actuator-side electric devices 64A and 64B satisfying this condition, the number of the second electric wires 120 is two, and the number of types of the second wiring-side terminals 124A and 124B is two. The plurality of second electric wires 120 and the plurality of types of second wiring-side terminals 124A and 124B respectively correspond to the plurality of actuator-side electric devices 64A and 64B to be electrically connected to the external device 28, and are used for electrical connection to the corresponding actuator-side electric devices 64A and 64B.

The second electric wire 120 includes a plurality of conductive second conducting wires 128, and a second covering material 130 having insulation properties that covers the plurality of second conducting wires 128. The plurality of second conducting wires 128 are used for electrical connection to the actuator-side electric devices 64A and 64B corresponding to the second electric wires 120.

The number of the second wiring-side connectors 122 corresponding to the external connectors 114A and 114B used for the second wiring member 26 is the same as the number of the external connectors 114A and 114B. Since there are two external connectors 114A and 114B in the present embodiment, the number of the second wiring-side connectors 122 is two. The plurality of second wiring-side connectors 122 respectively correspond to the plurality of external connectors 114A and 114B, and are detachably connected to the corresponding external connectors 114A and 114B.

As described above, the first wiring member 24 in FIG. 2 includes a number of first electric wires 90 and a number of types of first wiring-side terminals 94A to 94C corresponding to the plurality of actuator-side electric devices 64A to 64C. On the other hand, unlike the first wiring member 24, the second wiring member 26 in FIG. 3 includes a number of second electric wires 120 a number of types of terminals 124A and 124B corresponding to the actuator-side electric devices 64A and 64B to be electrically connected to the external device 28. Further, the plurality of first electric wires 90 corresponding to the plurality of actuator-side electric devices 64A to 64C may be separated and not be bundled, or may be bundled with a binding material. In addition to this, the plurality of first electric wires 90 may be integrated by covering each first conducting wire 98 with a common first covering material 100. The same applies to the second electric wire 120 and the second covering material 130 of the second wiring member 26.

The effects of the actuator device 12 described above will be described.

The actuator 10 includes an actuator-side connector 18 that is detachably connected to the driver-side connector 22 of the driver 14. Therefore, in addition to the first use mode in which the connectors 18 and 20 are connected, the actuator 10 can be used in other use modes in which the connectors 18 and 20 are disconnected. The "other use modes" here mean, for example, any use mode among the above-described second use mode and third use mode. As a result, the use mode of the actuator 10 can be flexibly changed according to the user's request, and the usability of the actuator 10 can be improved.

For example, when the user requests that the wiring member is not to be used, the actuator 10 can be used in the first use mode in which the connectors 18 and 20 are directly connected to electrically connect the actuator 10 and the driver 14. This is advantageous in that the actuator 10 can be effectively used, for example, in a situation where it is difficult to secure a disposition space for the wiring member. In addition to this, when the user requests that the driver 14 provided by the provider is disposed at a position away from the actuator 10, the actuator 10 can be used in the second use mode where the actuator 10 and the driver 14 are electrically connected by using the first wiring member 24. This is advantageous in that the actuator 10 can be effectively used in a situation where it is difficult to secure a disposition space for the driver 14 around the actuator 10. In addition to this, when the user requests that the external device 28 prepared by the user is to be used, the actuator 10 can be used in the third use mode. There is an advantage that the provider of the actuator 10 does not need to prepare a dedicated actuator 10 for each use mode.

The actuator 10 may be used in the fourth use mode in which the actuator 10 is electrically connected to the external device 28 by using the second wiring member 26 prepared by the user, as the "other use mode" here. In addition to this, the actuator 10 may be used in the fifth use mode in which the external device 28 prepared by the user is directly electrically connected. In this case, the actuator-side electric devices 64A to 64C and the external device 28 may be electrically connected by directly connecting the external connector of the external device 28 to the actuator-side connector 18.

The actuator-side connector 18 and the driver-side connector 22 are a male connector 78 and a female connector 82 that are fitted to each other. Therefore, the actuator-side connector 18 and the driver-side connector 22 can be firmly connected by the male connector 78 and the female connector 82 being fitted.

The actuator-side connector 18 and the driver-side connector 22 are provided with a plurality of types of terminals 68A to 68C respectively corresponding to the plurality of actuator-side electric devices 64A to 64C. Therefore, the driver 14 can be electrically connected to each of the plurality of actuator-side electric devices 64A to 64C, simply by connecting the connectors 18 and 22.

The actuator device 12 includes the first wiring member 24 that electrically connects the actuator 10 and the driver 14. Therefore, the actuator 10 can be used in the use mode selected by the user from among the first use mode and the second use mode described above.

The first wiring member 24 includes a pair of first wiring-side connectors 92A respectively connected to the actuator-side connector 18 and the driver-side connector 22. Therefore, when connecting the first wiring member 24 to the actuator 10 and the driver 14, it is not necessary to provide the actuator 10 and the driver 14 with a dedicated connector for the first wiring member 24, separate from the actuator-side connector 18 and the driver-side connector 22.

At least one of a combination of the first wiring-side connector 92A and the driver-side connector 22 and a combination of the first wiring-side connector 92B and the actuator-side connector 18 is configured with the same parts. Therefore, the manufacturing cost can be reduced, by sharing the parts used for the plurality of connectors 18, 22, 92A, and 92B.

The actuator device 12 includes a second wiring member 26 that electrically connects the actuator 10 to an external device 28 other than the driver 14. Therefore, the actuator 10 can be electrically connected to an external device 28 different from the driver 14 by using the second wiring member 26, without changing the configuration of the actuator 10. In order to electrically connect the external device 28 to be used by the user to the actuator 10, the provider of the actuator 10 needs to prepare only the second wiring member 26 corresponding to the external device 28, without changing the configuration of the actuator 10. As a result, customization for supporting various external devices 28 to be used by the user can be easily realized.

Second Embodiment

As described above, the actuator 10 is in contact with the supported member 50 and the driven member 42 (see FIG. 4), and the heat generated inside the actuator 10 is easily dissipated to the outside by heat conduction. On the other hand, the driver 14 attached to the actuator 10 by using the connectors 18 and 22 usually does not come into contact with the external member, and it is difficult to dissipate the heat generated inside the driver 14 to the outside by heat conduction. Hereinafter, the devised countermeasures will be described.

Figure 5A:
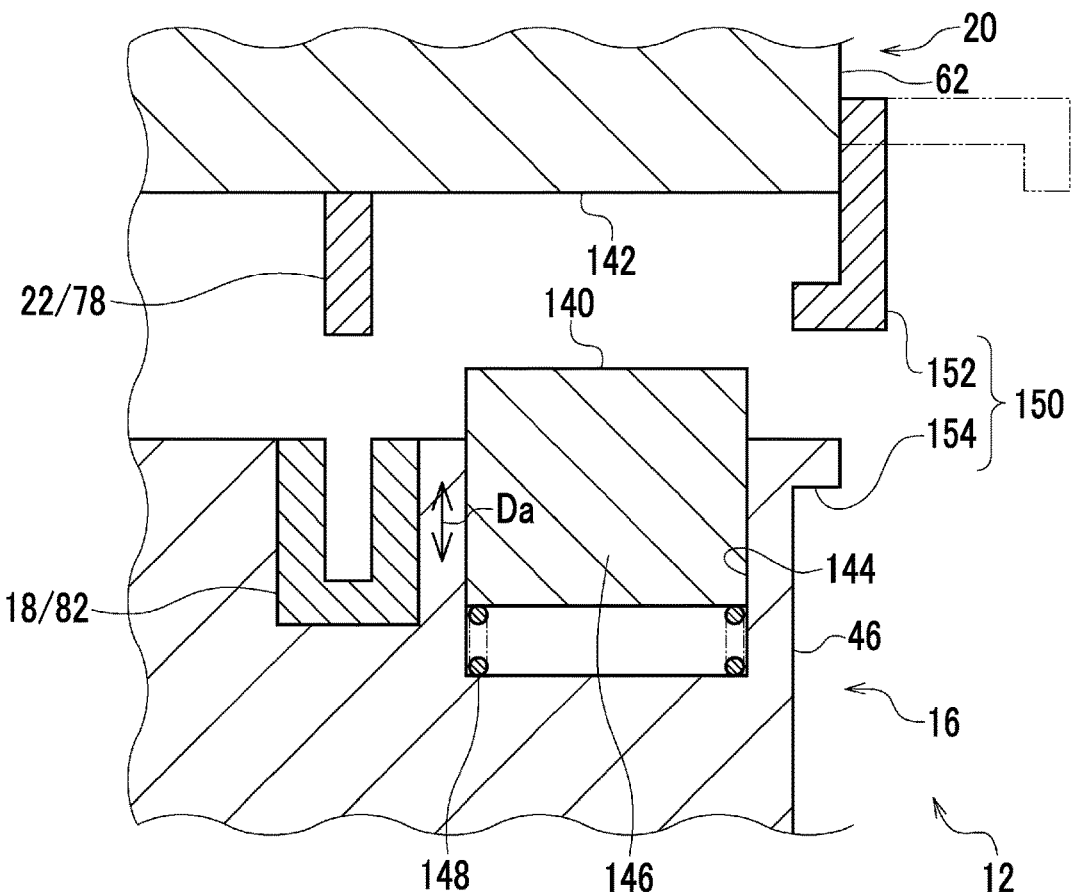
FIG. 5A is a schematic view showing a state in which a driver is being attached to an actuator of a second embodiment.
Figure 5B:
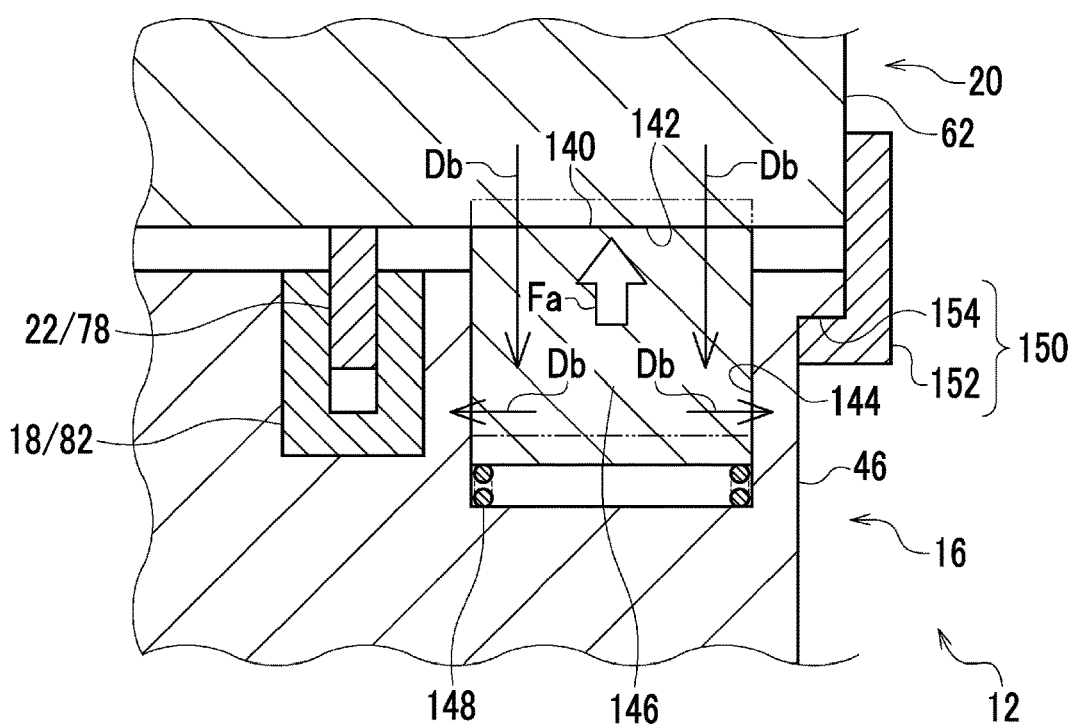
FIG. 5B is a schematic view showing a state in which the driver is attached to the actuator.

FIGS. 5A and 5B are referred to. The actuator main body 16 of the second embodiment includes an actuator-side contact surface 140. Further, the driver main body 20 of the present embodiment includes a driver-side contact surface 142 facing the actuator-side contact surface 140. In the present embodiment, the actuator-side contact surface 140 is provided on the actuator casing 46, and the driver-side contact surface 142 is provided on the driver casing 62. The portions where the contact surfaces 140 and 142 are provided (here, the actuator casing 46 and the driver casing 62) are preferably configured using a material having excellent thermal conductivity such as aluminum. The respective contact surfaces 140 and 142 of the actuator main body 16 and the driver main body 20 come into contact with each other when the driver-side connector 22 and the actuator-side connector 18 are in a connected state. As the "contact" here, in the present embodiment, the case where the actuator-side contact surface 140 and the driver-side contact surface 142 are in direct contact with each other will be described. In addition to this, the "contact" also includes the case of indirect contact via another element described later (for example, thermal grease 156 described later).

The actuator main body 16 includes a slide guide portion 144 provided as a recessed portion on its outer surface portion, and a slide portion 146 provided in a slidable manner in the attachment and detachment direction Da (combination of the connection direction and the connection release direction) of the connectors 18 and 22 with respect to the slide guide portion 144. The slide guide portion 144 and the slide portion 146 are provided on the actuator casing 46 in the same manner as the actuator-side contact surface 140, and the actuator-side contact surface 140 is provided on the slide portion 146.

The actuator device 12 includes a pressing portion 148 that presses the actuator-side contact surface 140 against the driver-side contact surface 142. The pressing portion 148 of the present embodiment is an elastic body separate from the actuator main body 16, and is provided between the bottom portion of the slide guide portion 144 and the slide portion 146. The pressing portion 148 of the present embodiment is a spring, but specific examples thereof are not particularly limited, and rubber or the like may be used. The pressing portion 148 elastically compresses and deforms, when the driver-side connector 22 and the actuator-side connector 18 are in a connected state (see FIG. 5B). The compression deformation direction of the pressing portion 148 is, for example, a connection direction in which the connectors 18 and 22 are brought close to each other when the connectors 18 and 22 are connected. As a result, the pressing portion 148 can press the actuator-side contact surface 140 against the driver-side contact surface 142 by the repulsive force caused by the elastic deformation.

As described above, the actuator main body 16 and the driver main body 20 include respective contact surfaces 140 and 142 that come into contact with each other when the actuator main body 16 and the driver main body 20 are connected to each other by using the connectors 18 and 22. Therefore, the heat of the driver main body 20 which is in a situation where it is difficult to dissipate heat to the outside by heat conduction can be transferred to the actuator main body 16 through the contact surfaces 140 and 142 by heat conduction, and the heat dissipation of the driver main body 20 can be promoted.

FIG. 5B shows the heat conduction direction db from the driver main body 20 to the actuator main body 16. When the slide portion 146 is provided on the actuator main body 16 as in the present embodiment, heat transfer occurs between the slide portion 146 and the slide guide portion 144, in the process of dissipating heat from the driver main body 20 to the actuator main body 16.

The actuator main body 16 includes the pressing portion 148 that presses the actuator-side contact surface 140 against the driver-side contact surface 142. A case is considered where the relative positions of the actuator main body 16 and the driver main body 20 fluctuate due to the influence of an error such as a dimensional error, when the connectors 18 and 22 are connected. Even in this case, the error can be absorbed by pressing one of the contact surfaces 140 and 142 against the other by the pressing portion 148. As a result, the actuator-side contact surface 140 and the driver-side contact surface 142 can be stably brought into contact in order to promote heat dissipation of the driver main body 20 while suppressing the influence of errors.

Up to this point, an example has been described in which the pressing portion 148 is a separate body from the actuator main body 16. In addition to this, in order to obtain the effect described here, a part of the actuator main body 16 itself may be formed of an elastic body, and the pressing portion 148 may be formed by the actuator main body 16 itself.

Further, up to this point, the pressing portion 148 has been described as being provided on the actuator main body 16 and pressing the actuator-side contact surface 140 against the driver-side contact surface 142. In addition to this, the pressing portion 148 may be provided on the driver main body 20, and press the driver-side contact surface 142 against the actuator-side contact surface 140. In other words, it can be said that the actuator device 12 may include the pressing portion 148 that presses one contact surface among the contact surfaces of the actuator main body 16 and the driver main body 20 against the other contact surface. When the pressing portion 148 is provided on the driver main body 20, the slide guide portion 144 and the slide portion 146 described above may be provided on the driver main body 20 instead of the actuator main body 16.

The actuator device 12 of the present embodiment is provided with a detachment prevention mechanism 150 that prevents the connectors 18 and 22 from being detached by limiting the relative movement of each of the connectors 18 and 22 in the connection release direction (the direction away from each other up and down on the paper surface in FIG. 5B). The detachment prevention mechanism 150 of the present embodiment is a combination of a claw portion 152 provided on one (here, the driver main body 20) of the driver main body 20 and the actuator main body 16, and a claw receiving portion 154 that is provided on the other (actuator main body 16) and on which the claw portion 152 is hooked. The claw portion 152 of the present embodiment is a movable type, and can move between an avoidance position where the claw portion 152 avoids contact with the claw receiving portion 154 when the connectors 18 and 22 are relatively moved in the connection direction (the direction in which the connectors 18 and 22 approach each other in the vertical direction of the paper surface in FIG. 5A) and a hooking position where the claw portion 152 can be hooked on the claw receiving portion 154. By using the detachment prevention mechanism 150, it is possible to maintain the state in which the connectors 18 and 22 are connected, even when the elastic repulsive force Fa by the pressing portion 148 in the connection release direction acts on each of the connectors 18 and 22. The detachment prevention mechanism 150 may also be configured by using a screw, and the claw portion 152 may not be movable.

Third Embodiment

Figure 6A:
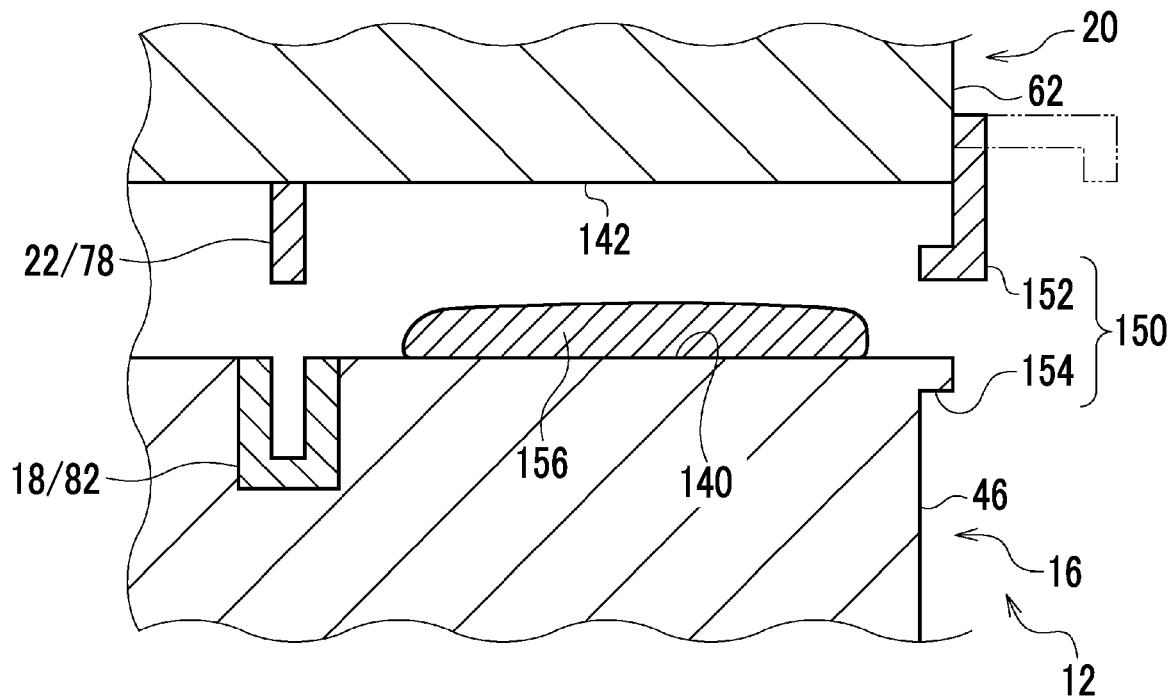
FIG. 6A is a schematic view showing a state in which a driver is being attached to an actuator of a third embodiment.
Figure 6B:
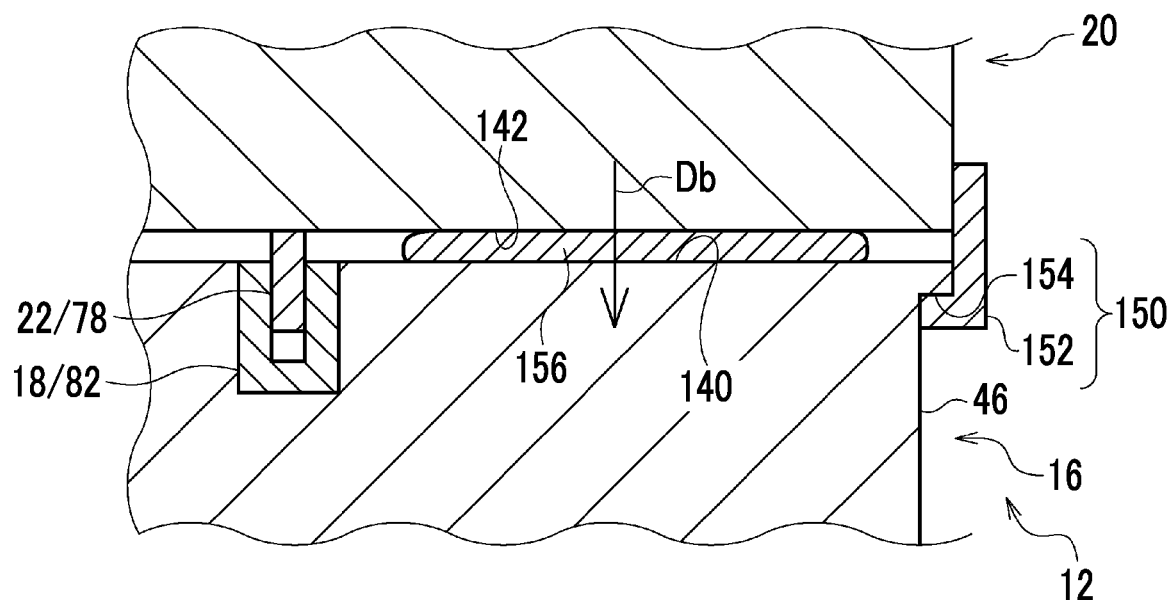
FIG. 6B is a schematic view showing a state in which the driver is attached to the actuator.

FIGS. 6A and 6B are referred to. The actuator device 12 of the present embodiment is different from the second embodiment in that a semi-solid thermal grease 156 is provided between the actuator-side contact surface 140 and the driver-side contact surface 142. These contact surfaces 140 and 142 come into contact with each other via the thermal grease 156. The thermal grease 156 is used to promote heat transfer from the driver-side contact surface 142 to the actuator-side contact surface 140. Specific examples of the thermal grease 156 are not particularly limited, and a mixture of an oil such as silicone oil and a filler such as metal powder may be used.

The thermal grease 156 is pre-applied to at least one of the actuator-side contact surface 140 and the driver-side contact surface 142 when the driver-side connector 22 and the actuator-side connector 18 are connected (see FIG. 6A). A case is considered where the driver-side connector 22 and the actuator-side connector 18 are relatively moved in the connection direction (the direction in which the connectors 22 and 18 approach each other in the vertical direction of the paper surface in FIG. 6A). In this case, the thermal grease 156 is crushed and deformed between the actuator-side contact surface 140 and the driver-side contact surface 142 so as to spread therebetween.

A case is considered where the relative positions of the actuator-side contact surface 140 and the driver-side contact surface 142 fluctuate due to the influence of an error, when the connectors 18 and 22 are connected. Even in this case, due to the deformation of the thermal grease 156, it is possible to maintain the state in which the contact surfaces 140 and 142 are brought into contact while absorbing the error. As a result, the actuator-side contact surface 140 and the driver-side contact surface 142 can be stably brought into contact in order to promote heat dissipation of the driver main body 20 while suppressing the influence of errors.

Fourth Embodiment

Figure 7:
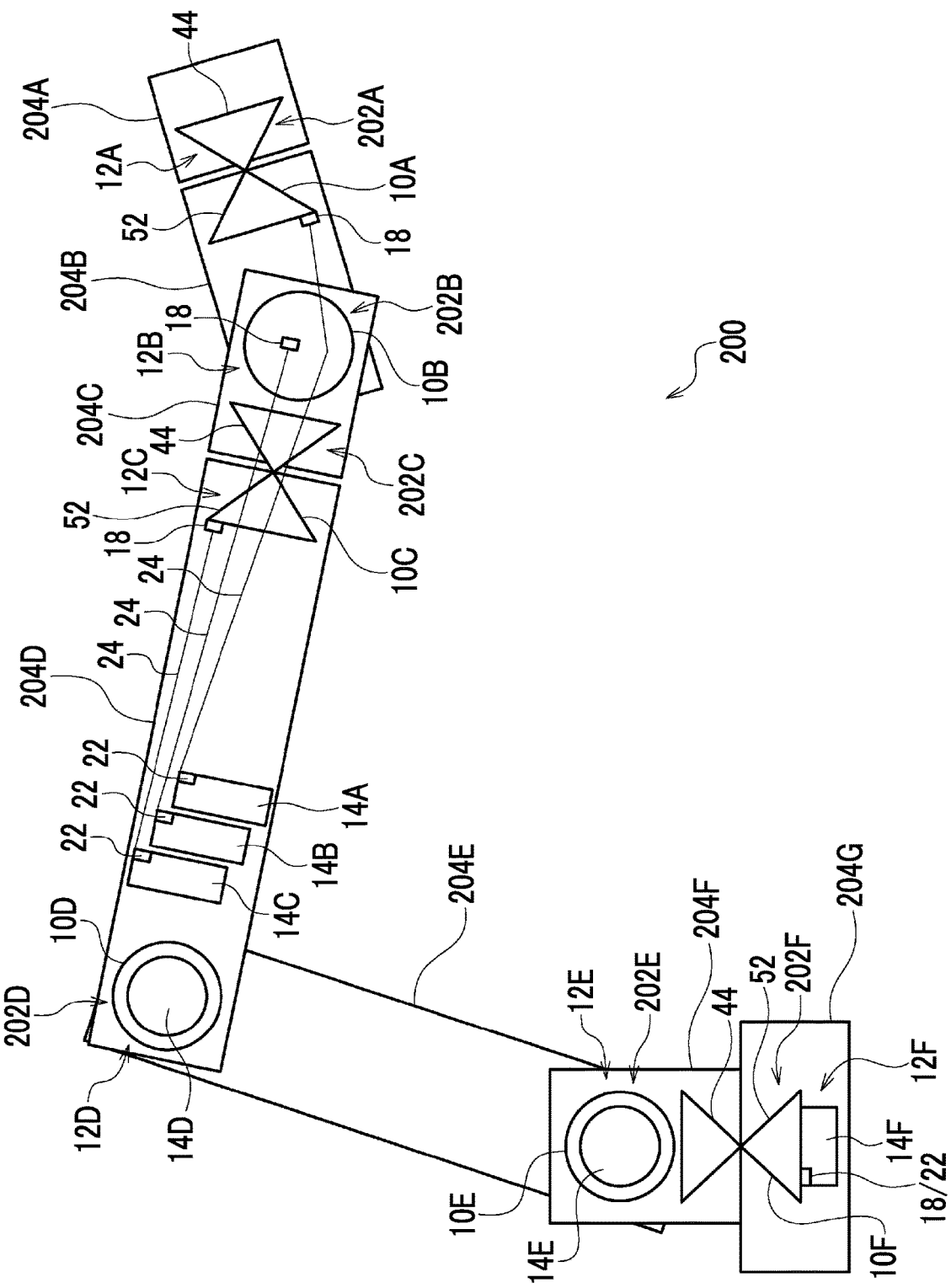
FIG. 7 is a schematic view showing a robot according to a fourth embodiment.

FIG. 7 is referred to. Next, the robot 200 using the actuator device 12 described so far will be described. The robot 200 of the present embodiment is an industrial robot, but specific examples thereof are not particularly limited, and a service robot or the like may be used. The robot 200 of the present embodiment is a 6-axis articulated robot having 6 joints.

The robot 200 includes a plurality of joints 202A to 202F, a plurality of connection bodies 204A to 204G connected in series by the plurality of joints 202A to 202F, and a plurality of actuator devices 12A to 12F respectively corresponding to the plurality of joints 202A to 202F.

The joints 202A to 202F connect adjacent connection bodies 204A to 204G. The plurality of joints 202A to 202F include a first-stage joint 202A, a second-stage joint 202B, a third-stage joint 202C, a fourth-stage joint 202D, a fifth-stage joint 202E, and a sixth-stage joint 202F from the tip end side to the base end side of the robot 200.

The plurality of connection bodies 204A to 204G include a base 204G disposed on the most base end side of the robot 200, and a plurality of links 204A to 204F supported by the base 204G. The plurality of links 204A to 204F include a first-stage link 204A, a second-stage link 204B, a third-stage link 204C, a fourth-stage link 204D, a fifth-stage link 204E, and a sixth-stage link 204F from the tip end side to the base end side of the robot 200. A robot hand (not shown) is attached to the first-stage link 204A on the most tip end side.

The plurality of actuator devices 12A to 12F include a first-stage actuator device 12A to a sixth-stage actuator device 12F respectively corresponding to the first-stage joint 202A to the sixth-stage joint 202F. Each of the first-stage actuator device 12A to the sixth-stage actuator device 12F is the actuator device 12 described above, and includes the actuator 10 and the driver 14 described above. Here, in order to distinguish the plurality of actuator devices 12A to 12F, ordinal numbers (first-stage, second-stage, or the like) are added to the beginning of the name, and alphabets (A, B, C, or the like) are added to the end of the reference numeral. Further, by attaching the same numbers and alphabets as the ordinal numbers and the alphabets identifying the actuator devices 12A to 12F to the actuators 10 and the drivers 14, the actuator 10 and the driver 14 of each of the first-stage actuator device 12A to the sixth-stage actuator device 12F can be distinguished. For example, the actuator 10 and the driver 14 of the first-stage actuator device 12A will be described as a first-stage actuator 10A and a first-stage driver 14A.

The actuators 10A to 10F of the actuator devices 12A to 12F are incorporated into the joints 202A to 202F corresponding to the actuators 10A to 10F. For example, the first-stage actuator 10A is incorporated in the first-stage joint 202A, and the second-stage actuator 10B is incorporated in the second-stage joint 202B. The support members 52 (see FIG. 4) of the actuators 10A to 10F are attached to the connection bodies on the base end sides of the adjacent connection bodies 204A to 204G, and the output members 44 (see FIG. 4) of the actuators 10 are attached to the connection bodies on the tip end sides of the adjacent connection bodies 204A to 204G. For example, the support member 52 of the first-stage actuator 10A is attached to the second-stage link 204B on the base end side, and the output member 44 of the first-stage actuator 10A is attached to the first-stage link 204A on the tip end side.

The actuators 10A to 10F can relatively rotate the adjacent connection bodies 204A to 204G connected at the joints 202A to 202F corresponding to the actuators 10A to 10F. For example, the first-stage actuator 10A can relatively rotate the first-stage link 204A and the second-stage link 204B which are connected at the first-stage joint 202A.

In the present embodiment, at least some actuators 10A to 10F among the plurality of actuators 10A to 10F are used in the first use mode in which the connectors 18 and 22 are connected and electrically connected to the driver 14 (here, some connectors 18 and 22 are not shown). In the present embodiment, the fourth-stage actuator 10D to the sixth-stage actuator 10F are used in the first use mode. Further, the remaining actuators 10A to 10C among the plurality of actuators 10A to 10F are used in the second use mode in which the actuators 10A to 10C are electrically connected to the drivers 14A to 14C by using the first wiring member 24. In the present embodiment, the first-stage actuator 10A to the third-stage actuator 10C are used in the second use mode.

The first-stage driver 14A to the third-stage driver 14C are disposed at positions away from the first-stage actuator 10A to the third-stage actuator 10C controlled by the first-stage driver 14A to the third-stage driver 14C. The first-stage driver 14A to the third-stage driver 14C are attached to the fourth-stage link 204D located on the base end side from each of the first-stage joint 202A to the third-stage joint 202C in which the actuators 10A to 10C controlled by the first-stage driver 14A to the third-stage driver 14C are incorporated. It can be said that the plurality of drivers 14A to 14C that control the actuators 10A to 10C used in the second use mode are attached to a common connection body 204D located on the base end side from the connection bodies 204A to 204C in which the actuators 10A to 10C are incorporated. The first-stage driver 14A to the third-stage driver 14C are directly attached to the fourth-stage link 204D by using, for example, a fixing tool such as a screw. In addition to this, as described later, only one driver 14 may be attached to the connection body, and the other drivers 14 may be attached to the connection body via the one driver 14 by connecting the other drivers 14 to the one driver 14.

The fourth-stage driver 14D to the sixth-stage driver 14F are attached by connecting the connectors 18 and 22 to the actuators 10 corresponding to the fourth-stage driver 14D to the sixth-stage driver 14F. The first-stage driver 14A to the sixth-stage driver 14F are electrically connected to a host controller (not shown) by a daisy chain connection, a bus connection, or the like.

The effects of the robot 200 described so far will be described.

(A) The actuators 10A to 10F that can be used in the plurality of use modes described above are used for the robot 200. Therefore, the robot 200 can be actually obtained by using the actuators 10A to 10F whose usage can be flexibly changed.

(B) The drivers 14A to 14C that control the actuators 10A to 10C are disposed at positions away from the actuators 10A to 10C. Therefore, there is no need for a disposition space for the drivers 14A to 14C around the actuators 10A to 10C controlled by the drivers 14A to 14C.

(C) The plurality of drivers 14A to 14C are attached to the common connection body 204D at a position away from the actuators 10A to 10C controlled by the plurality of drivers 14A to 14C. Therefore, there is no need for a disposition space for the drivers 14A to 14C around the actuators 10A to 10C controlled by the plurality of drivers 14A to 14C. Further, the plurality of drivers 14A to 14C can be collectively attached to one connection body 204D, and the workability at the time of maintenance can be improved.

In addition to this, when the driver 14 is attached to the connection body 204D on the base end side of the robot 200 from the joints 202A to 202C in which the actuators 10A to 10C controlled by the drivers 14A to 14C are incorporated, the center of gravity of the robot 200 can be approached to the base end side of the robot 200. As a result, the load to be applied when moving the first-stage link 204A on the most tip end side of the robot 200 can be reduced.

Further, since the plurality of drivers 14 are incorporated into the robot 200, it is not necessary to dispose the plurality of drivers 14 in the external control box, and there is an advantage that the control box can be miniaturized. Further, the provider (seller, or the like) of the robot 200 tunes the above-described control parameters (proportional gain, or the like) necessary for controlling the actuator 10 and stores the control parameters in the storage unit of the driver 14, so that tuning on the user side can be made unnecessary.

Fifth Embodiment

Figure 8:
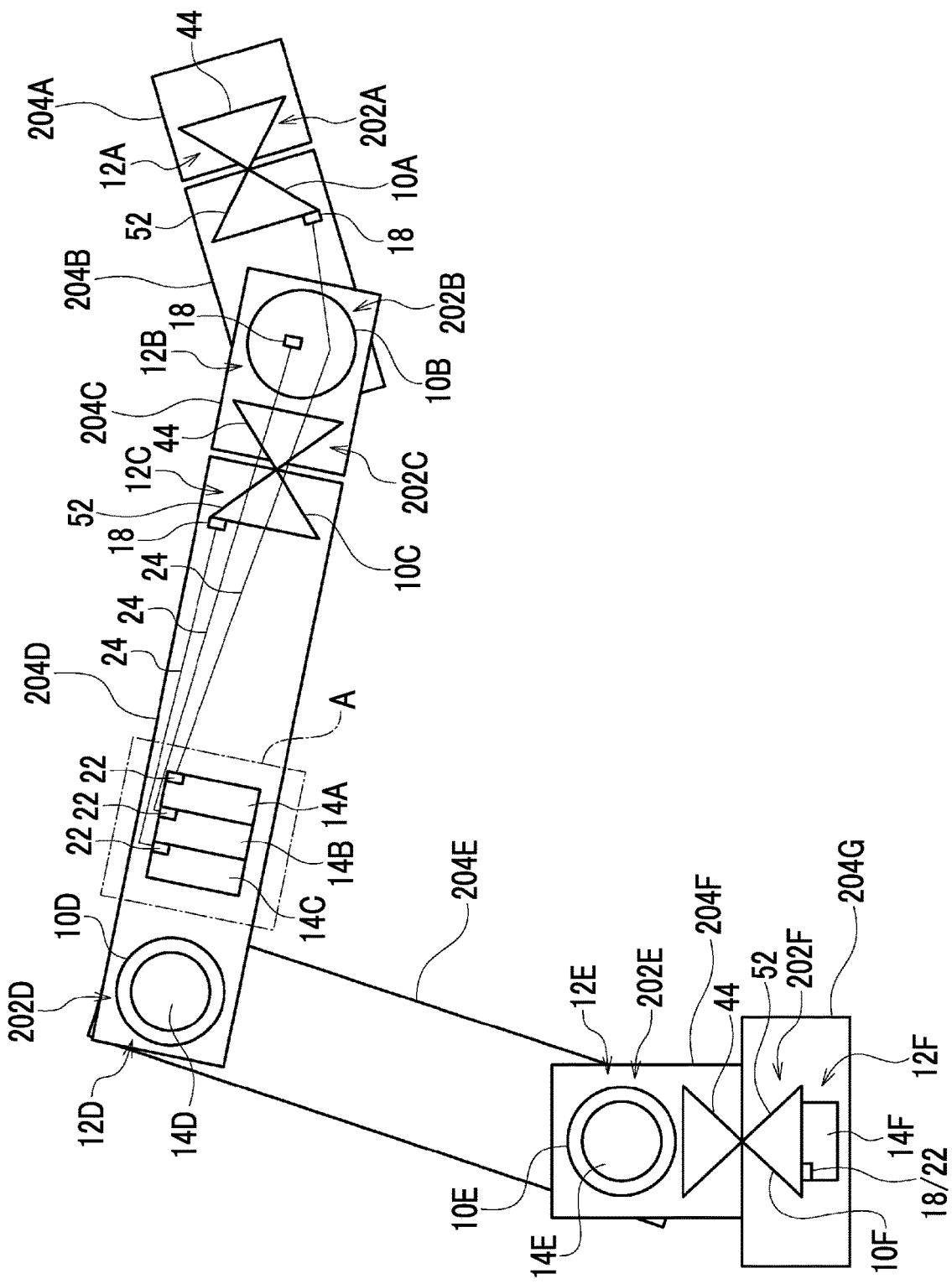
FIG. 8 is a schematic view showing a robot according to a fifth embodiment.
Figure 9:
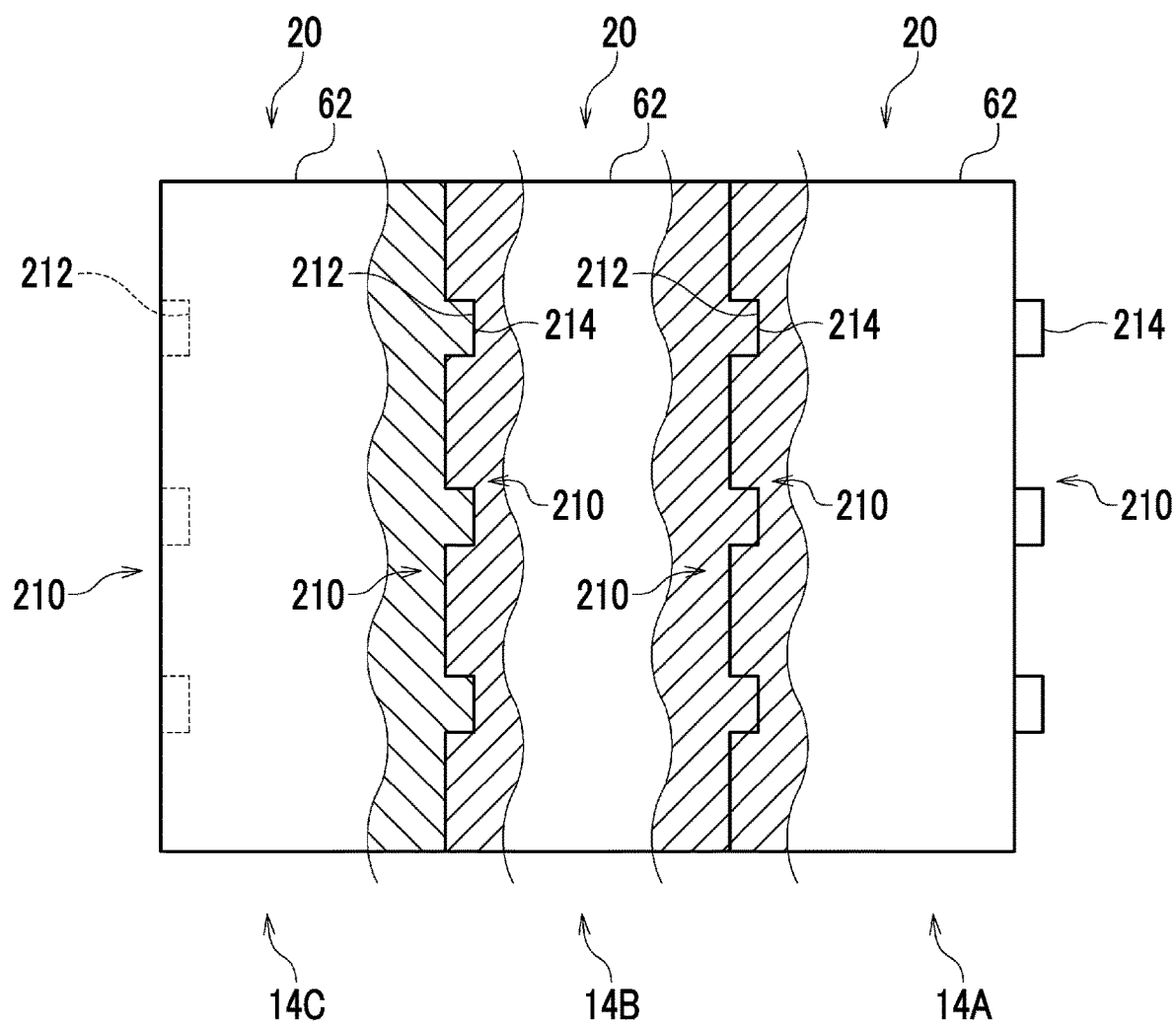
FIG. 9 is a schematic view showing a plurality of drivers in a range A of FIG. 8.

FIGS. 8 and 9 are referred to. The present embodiment is different from the fourth embodiment in the configurations of the first-stage driver 14A to the third-stage driver 14C. The drivers include connecting portions 210 that are connected to the other drivers 14A to 14C.

Specifically, the drivers 14A to 14C include a connecting portion 210 that is connected to the other drivers 14A to 14C in cooperation with the connecting portion 210 provided in the other drivers 14A to 14C. The connecting portion 210 is provided in the driver main body 20 (here, the driver casing 62) of each of the drivers 14A to 14C. In the present embodiment, the connecting portion 210 used for connecting the adjacent drivers 14 has uneven structure. Adjacent drivers 14A to 14C are connected by fitting the projected portion 214 of the uneven structure of the other driver main body 20 into the recessed portion 212 of the uneven structure of one driver main body 20 with press fitting. In addition to this, the connecting portion 210 used for connecting the adjacent drivers 14A to 14C may be a combination of a male connector and a female connector, a combination of magnet having different polarities, or the like. The plurality of drivers 14A to 14C may be arranged and connected in the same direction using the connecting portion 210, or may be arranged and connected in different directions.

Thus, in the actuator device 12, the plurality of drivers 14A to 14C separated from the actuators 10A to 10C can be collectively handled. As a result, good workability can be obtained when handling the plurality of drivers 14A to 14C for attachment to a partner machine such as the robot 200.

Next, a series (product group) of the actuator device will be described. The series described below can also be regarded as each of a manufacturing method and a design method for obtaining a series of actuator devices.

Figure 10A:
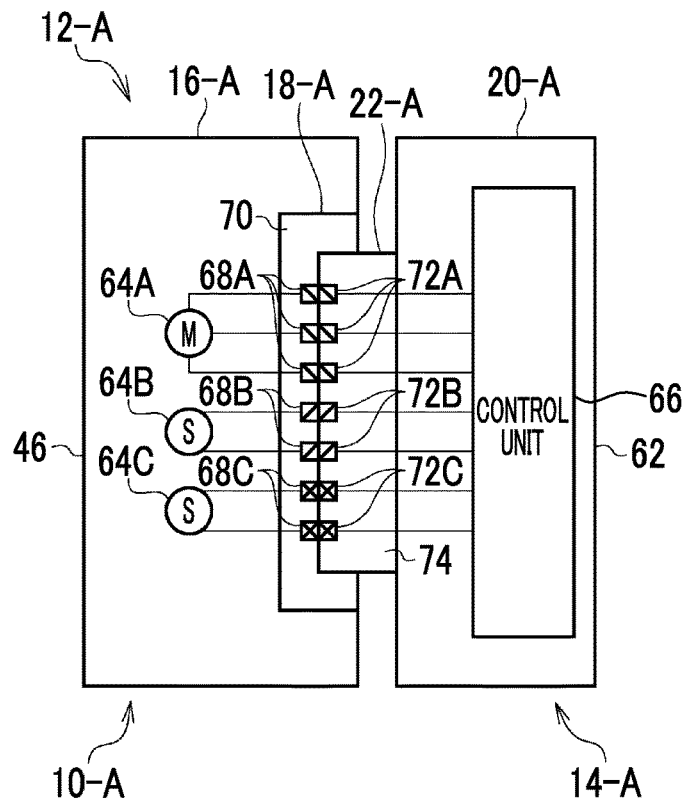
FIG. 10A is a schematic view showing a first actuator device belonging to a series.
Figure 10B:
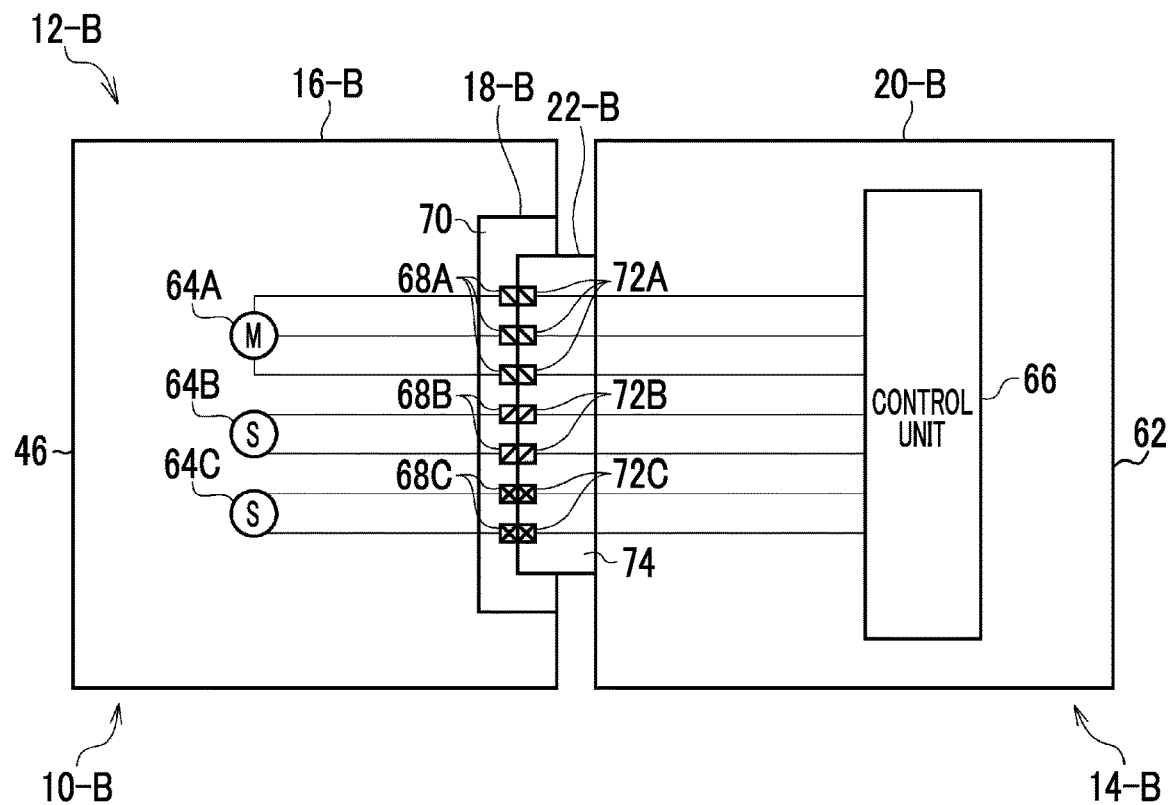
FIG. 10B is a schematic view showing a second actuator device belonging to the series.

FIGS. 10A and 10B are referred to. The series includes a first actuator device 12-A and a second actuator device 12-B. The components (actuator, driver, or the like) of each actuator device 12-A have the same basic functions as the components of the actuator device 12 described above. Hereinafter, the components common to the above-described contents used in the first actuator device 12-A and the second actuator device 12-B are distinguished by adding "first, second" to the beginning of the name, and adding "-A, -B" to the end of the reference numeral.

The first actuator device 12-A includes a first actuator 10-A, and a first driver 14-A that controls the first actuator 10-A. The first actuator 10-A includes a first actuator main body 16-A, and a first actuator-side connector 18-A attached to the first actuator main body 16-A. The first driver 14-A includes a first driver main body 20-A, and a first driver-side connector 22-A attached to the first driver main body 20-A.

The second actuator device 12-B includes a second actuator 10-B, and a second driver 14-B that controls the second actuator 10-B. The second actuator 10-B includes a second actuator main body 16-B, and a second actuator-side connector 18-B attached to the second actuator main body 16-B.

The second driver 14-B includes a second driver main body 20-B, and a second driver-side connector 22-B attached to the second driver main body 20-B.

At least one of the first actuator main body 16-A and the second actuator main body 16-B, and the first driver main body 20-A and the second driver main body 20-B is different in structure. The difference in the structure here includes not only the case of a difference in the presence or absence of a specific component, but also the case of a difference in dimensions of the component in the above-mentioned two combinations of components. A difference in dimensions is also established when the above-mentioned two combinations of components are similar. In the present embodiment, an example where the dimensions of the actuator casings 46 are different in the first actuator main body 16-A and the second actuator main body 16-B, and an example where the dimensions of the first driver main body 20-A and the second driver main body 20-B are different are shown.

The first actuator-side connector 18-A and the second actuator-side connector 18-B are configured with the same parts. Further, the first driver-side connector 22-A and the second driver-side connector 22-B are configured with the same parts. As described above, the definition of "same parts" here means that the shape and dimensions of the parts configuring the two connectors mentioned above are the same as well as the material thereof. For example, regarding the first actuator-side connector 18-A and the second actuator-side connector 18-B, both use the same actuator-side connector housing 70, and use the same number of types and the same number of actuator-side terminals 68A to 68C. Regarding the first driver-side connector 22-A and the second driver-side connector 22-B, both use the same driver-side connector housing 74, and use the same number of types and the same number of driver-side terminals 72A to 72C.

Thus, the connectors 18-A, 18-B, 22-A, and 22-B common among the plurality of actuator devices 12-A and 12-B can be used, and the manufacturing cost can be reduced.

Next, a modification example of each component described so far will be described. Hereinafter, when the components (actuator-side electric device, or the like) having "A, B, C" at the end of the reference numeral are generically referred to, the components are omitted.

An example has been described in which there are a total of three use modes of the actuator 10 that can be selected by the user in the first embodiment: the first use mode, the second use mode, and the third use mode. In addition to this, the use modes that the user can select may be a total of two use modes of the first use mode and the second use mode, or may be a total of two use modes of the first use mode and the third use mode. It can be said that the actuator device 12 may include only the first wiring member 24 or may include only the second wiring member 26, among the first wiring member 24 and the second wiring member 26.

Actuator

The specific example and the number of actuator-side electric devices 64 to be electrically connected to the driver 14 are not particularly limited. The actuator-side electric device 64 may be, for example, an electromagnetic brake, a microcomputer, or the like, in addition to the drive source 40, the sensors 56 and 58. The number of the actuator-side electric devices 64 is not particularly limited, and may be singular, two, or four or more. Further, when a plurality of actuator-side electric devices 64 are provided, one thereof may be a drive source 40 (electric motor) regardless of the type of the remaining actuator-side electric devices 64.

The type of the electric motor as the drive source 40 is not particularly limited. The electric motor may be, for example, a DC motor, a single-phase AC motor, or the like, in addition to the three-phase AC motor.

The types of sensors 56 and 58 are not particularly limited. The sensors 56 and 58 may be, for example, temperature sensors that detect the temperature inside the actuator main body 16.

Driver

Although the example in which the driver main body 20 of the driver 14 includes the driver casing 62 has been described, the driver casing 62 may not be provided. This assumes, for example, a case where the driver main body 20 is configured with only the control board constituting the control unit 60.

The method of controlling the actuator 10 by the control unit 60 of the driver 14 is not particularly limited. For example, the control unit 60 may perform feedback-control such that the output value (torque) output from the second sensor 58 approaches the control target value.

Connector

Specific examples of the actuator-side connector 18 and the driver-side connector 22 are not limited to the combination of the male connector 78 and the female connector 82. For example, one of the actuator-side connector 18 and the driver-side connector 22 may be used as a hook, and the other may be used as a hook receiver for receiving the hook. In this case, the terminals 68 and 72 of the connectors 18 and 22 may be provided with terminals at the contact portions between the hook and the hook receiver.

An example has been described in which the actuator-side connector 18 and the driver-side connector 22 are provided with a plurality of types of terminals 68 and 72 respectively corresponding to the plurality of actuator-side electric devices 64. In addition to this, only one type of terminal corresponding to a single actuator-side electric device may be provided.

The actuator 10 and the driver 14 may be provided separately from the actuator-side connector 18 and the driver-side connector 22, and may include a dedicated connector connected to the first wiring member 24.

Wiring Member

Each of the combination of one first wiring-side connector 92A and the driver-side connector 22 and the combination of the other first wiring-side connector 92B and the actuator-side connector 18 may be individually configured with different parts. For example, at least one of the connector housing and the terminal may have a different shape between the one first wiring-side connector 92A and the driver-side connector 22. For example, at least one of the connector housing and the terminal may have a different shape between the other first wiring-side connector 92B and the actuator-side connector 18.

External Device 28

Specific examples of the external device 28 are not particularly limited. The external device 28 may be, for example, a power supply device that is electrically connected to the drive source 40 of the actuator 10. Further, the number of external devices 28 is not particularly limited. The external device 28 may be a combination of a power supply device electrically connected to the drive source 40 and an information processing device (including a microcomputer) electrically connected to an actuator-side electric device 64 different from the drive source 40. In this case, separate from the second wiring member 26 that electrically connects the drive source 40 and the power supply device, another second wiring member 26 that electrically connects the actuator-side electric device 64 and the information processing device may be used. Further, the provider of the actuator device 12 may provide the external device 28 to the user together with the actuator device 12.

Robot

The number of joints 202 of the robot 200 is not particularly limited. For example, the number of joints 202 may be singular, 2 to 5, or 7 or more.

An actuator 10 that can be used in a plurality of use modes in relation to the driver 14 is referred to as a corresponding actuator 10, and an actuator that can be used in only one use mode is referred to as a non-corresponding actuator. The non-corresponding actuator is, for example, an actuator that is inseparably integrated with the driver or can be electrically connected to the driver only by using a wiring member.

At this time, in relation to the effect described in (A), the corresponding actuator 10 may be used for at least one of the joints 202A to 202F. For example, among the plurality of joints 202A to 202F, the corresponding actuators 10 may be incorporated into only some joints 202A to 202F, and the non-corresponding actuator may be incorporated into the remaining joints 202A to 202F. In addition to this, all of the corresponding actuator 10 used in the robot 200 may be used in either the first use mode or the second use mode.

In relation to the effect described in (B), at least one driver 14 may be disposed at a position away from the corresponding actuator 10. For example, unlike the embodiment, only the first-stage driver 14A among the plurality of drivers 14A to 14F may be disposed at a position away from the first-stage actuator 10A (corresponding actuator).

In relation to the effect described in (C), a plurality of drivers 14 may be attached to the common connection body 204 at a position away from the corresponding actuator 10 controlled by the drivers 14, and the connection body 204 to which the drivers are attached is not particularly limited.

The above embodiments and modification examples are examples. The technical ideas that abstract the embodiments and modification examples should not be construed as limited to the contents of the embodiments and modification examples. With respect to the contents of the embodiments and modification examples, many design changes such as the change, addition, and deletion of components can be made. In the above-described embodiments, the contents for which such a design change is possible are emphasized by adding the notation "embodiment". However, design changes are allowed even when there is no such notation in the contents. The hatching attached to the cross section of the drawing does not limit the material of the object to which the hatching is attached.

Any combination of the above components is also valid. For example, embodiments may be combined with any description of the other embodiments, and the modification examples may be combined with any description of the embodiments and modification examples. Further, the pressing portion 148 described in the second embodiment and the thermal grease 156 described in the third embodiment may be combined.

It should be understood that the invention is not limited to the above-described embodiment, but may be modified into various forms on the basis of the spirit of the invention. Additionally, the modifications are included in the scope of the invention.

What is claimed is:

1. An actuator device comprising a driver and an actuator controlled by the driver, wherein:

the actuator includes an actuator-side connector that is detachably connected to a driver-side connector provided in the driver, the actuator is able to be electrically connected to the driver, by connecting the actuator-side connector and the driver-side connector to each other, the actuator is provided with a plurality of electric devices, the actuator-side connector and the driver-side connector include a plurality of types of terminals, the actuator-side connector and the driver-side connector are configured to electrically connect to the corresponding electric devices via the plurality of types of terminals, and the driver includes a connecting portion to be connected to another driver.

2. The actuator device according to claim 1, wherein one of the actuator-side connector and the driver-side connector is a male connector having a projected shape, and the other is a female connector having a recessed shape that fits with the projected shape.

3. The actuator device according to claim 1, further comprising:

a second wiring member that electrically connects an external device other than the driver and the actuator.

4. A series of actuator devices comprising:

a first actuator device including a first actuator and a first driver, which are the actuator and the driver according to claim 1; and a second actuator device including a second actuator and a second driver, which are the actuator and driver according to claim 1, wherein the first actuator includes a first actuator main body, and a first actuator-side connector attached to the first actuator main body, the first driver includes a first driver main body, and a first driver-side connector attached to the first driver main body, the second actuator includes a second actuator main body, and a second actuator-side connector attached to the second actuator main body, the second driver includes a second driver main body, and a second driver-side connector attached to the second driver main body, at least one of the first actuator main body and the second actuator main body, and the first driver main body and the second driver main body is different in structure, the first actuator-side connector and the second actuator-side connector are configured with the same parts, and the first driver-side connector and the second driver-side connector are configured with the same parts.

5. The actuator device according to claim 1, wherein the actuator is provided with, as the plurality of electric devices, a drive source, and a first sensor and a second sensor for detecting a predetermined physical quantity.

6. The actuator device according to claim 5, wherein the drive source is an electric motor including a stator and a rotor.

7. The actuator device according to claim 6, further comprising an output member that outputs power transmitted from the drive source to a driven member outside the actuator, wherein the first sensor is a rotation sensor that detects a rotation angle of the output member, and the second sensor is a torque sensor that detects a torque of the output member.

8. The actuator device according to claim 1, further comprising:
a first wiring member that electrically connects the actuator and the driver.

9. The actuator device according to claim 8, wherein the first wiring member includes a pair of first wiring-side connectors individually connected to the actuator-side connector and the driver-side connector.

10. The actuator device according to claim 9, wherein one of the pair of first wiring-side connectors is connected to the actuator-side connector, and the other is connected to the driver-side connector, and
at least one of a combination of the one first wiring-side connector and the driver-side connector and a combination of the other first wiring-side connector and the actuator-side connector is configured with the same parts.

11. A robot comprising:
a first joint into which a first actuator, which is the actuator according to claim 1, is incorporated.

12. The robot according to claim 11, further comprising:
a first driver that is the driver according to claim 1, and controls the first actuator, wherein
the first driver is disposed at a position away from the first actuator.

13. The robot according to claim 12, further comprising:
a plurality of joints including the first joint; and
a plurality of connection bodies connected in series by the plurality of joints, wherein
the plurality of joints include a second joint into which a second actuator, which is the actuator according to claim 1, is incorporated,
the robot further includes a second driver that is the driver according to claim 1, and controls the second actuator, and
the first driver and the second driver are attached to a common connection body at a position away from the first actuator and the second actuator.

14. The robot according to claim 13, wherein
the first driver and the second driver are connected to each other.

15. The actuator device according to claim 1, wherein
the actuator includes an actuator main body to which the actuator-side connector is attached,
the driver includes a driver main body to which the driver-side connector is attached, and
the actuator main body and the driver main body include respective contact surfaces that come into contact with each other when the driver-side connector and the actuator-side connector are in a connected state.

16. The actuator device according to claim 15, further comprising:
a pressing portion that presses one contact surface among the contact surfaces of the actuator main body and the driver main body against the other contact surface.

17. The actuator device according to claim 15, wherein
the contact surface of the actuator main body and the contact surface of the driver main body come into contact with each other via thermal grease.

18. The actuator device according to claim 15, further comprising:
a detachment prevention mechanism that prevents the actuator-side connector and the driver-side connector from being detached.

19. The actuator device according to claim 18, wherein
the detachment prevention mechanism is a combination of a claw portion provided on one of the driver main body and the actuator main body, and a claw receiving portion provided on the other and on which the claw portion is hooked.

20. The actuator device according to claim 19, wherein
the claw portion is a movable type and is capable of moving between an avoidance position where the claw portion avoids contact with the claw receiving portion when each connector is relatively moved in a connection direction and a hooking position where the claw portion is capable of being hooked on the claw receiving portion.

* * * * *